Aug. 4, 1925.
V. E. FLODIN
VALVE HANDWHEEL
Filed Sept. 1, 1923
1,548,520
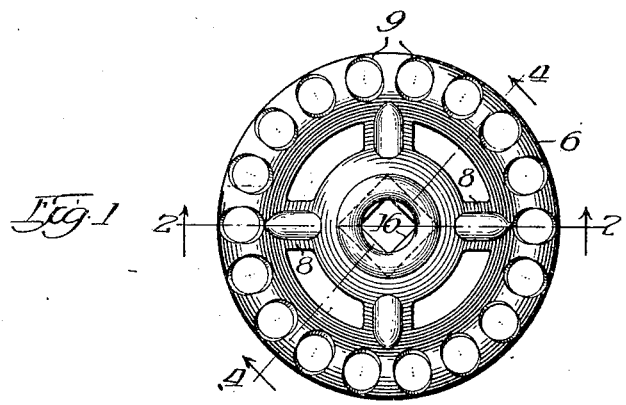
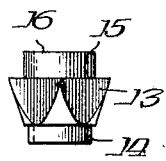
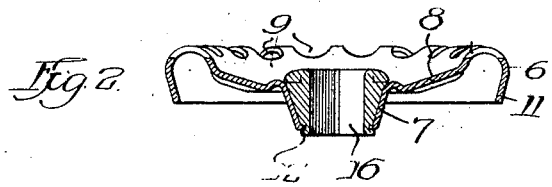
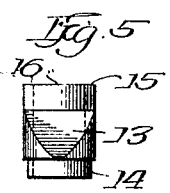
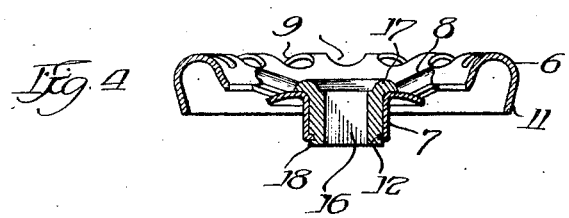
Witness:
Geo. C. Durant
Inventor
Victor E. Flodin
By Ira J. Wilson Atty Patented Aug. 4, 1925.

1,548,520

UNITED STATES PATENT OFFICE.

VICTOR E. FLODIN, OF CHICAGO, ILLINOIS, ASSIGNOR TO CRANE CO., OF CHICAGO, ILLINOIS, A CORPORATION OF ILLINOIS.

VALVE HANDWHEEL.

Application filed September 1, 1923. Serial No. 660,504.

*To all whom it may concern:*

Be it known that I, VICTOR E. FLODIN, a citizen of the United States, residing at Chicago, in the county of Cook and State of Illinois, have invented certain new and useful Improvements in Valve Handwheels, of which the following is a specification.

This invention pertains to handwheels, and while capable of employment for many purposes, is particularly adaptable for employment as a handwheel for valves.

It has heretofore been proposed to construct handwheels of this general character from stamped metal, and to provide such wheels with hub members made of heavier metal and adapted to fit the squared upper end of a valve stem. The cost of production, however, of such handwheels has been rather high, and when the hub member is riveted to the wheel structure or is held thereto by prongs or lips projecting from the stamped metal structure, the hub member is apt to work loose; and furthermore, it imposes strains upon relatively small areas of the stamped metal structure, which eventually become distorted and weakened so that the hub member becomes loose, if not entirely detached from the stamped metal wheel.

One of the primary purposes of my present invention is to provide a handwheel having a stamped metal body and a heavier metal hub, which is rigidly and securely fastened to the body so as to be incapable of either working loose or becoming separated from the body.

Another object is to provide a handwheel which can be manufactured at a low cost, and which will be strong and durable in use.

For the purpose of facilitating an understanding of my invention, I have illustrated on the accompanying drawings a preferred embodiment thereof, by reference to which, when considered in connection with the following description, my invention and many of its attendant advantages should be readily appreciated.

Fig. 1 is a top plan view of a handwheel constructed in accordance with my invention;

Fig. 2 is a sectional view taken on the line 2—2 of Fig. 1;

Fig. 3 is a detail elevational view of the hub member in the position in which it is shown in Figs. 1 and 2;

Fig. 4 is a sectional view on the line 4—4 of Fig. 1; and

Fig. 5 is a side elevation of the hub member in the position shown in Fig. 4.

Referring now to the drawings more in detail, it will be observed that the body of the handwheel, which is stamped from sheet metal of suitable weight, comprises the rim 6, the hub portion 7, and the radial spokes 8 joining the hub portion to the rim. The rim is provided with apertures 9 to facilitate cooling and to provide a better grip, but may be of any other desired design as will be understood and the rim flange 11 is turned downwardly and slightly inwardly at its lower end to provide a comfortable grip without presenting any sharp edges to be engaged by the hand of the operator.

The hub portion 7 is pressed downwardly from the metal of the body and is polygonal, preferably square, in shape so as to provide a polygonal socket for the reception of the hub member, which socket is open at both ends, the lower edge being inturned to provide a flange 12, all as will be apparent from Figs. 2 and 4.

The hub member, which is formed from heavier metal than the stamped body, presents between its ends a polygonal exterior, as indicated by reference character 13, is adapted to fit in an equal sided polygonal socket 7. Since the socket is somewhat tapered from top to bottom, the hub member is correspondingly shaped to fit snugly therein. A depending flange 14 extends beneath the polygonal portion 13 of the hub member, and an upwardly extending flange 15 projects above this polygonal portion. The hub member is cored longitudinally to provide a central squared or other shaped opening adapted to snugly fit the correspondingly shaped upper end of a standard valve stem.

When the hub member has been placed in the socket 7 of the handwheel body member, the flanges 14 and 15 project, respectively, below and above the lower and upper ends of the socket. The hub member is made of malleable material, and after being placed in the socket the projecting flanges 14 and 15 are subjected to a rolling or upsetting action which upsets the flange 15 into a radially disposed flange 17 embracing the margin of the upper end of the socket 7, while the lower flange 14 is similarly expanded and upset into a radial flange 18, engaging the margin of the socket flange 12. The flanges 17 and 18, thus formed, securely lock the hub member in the socket against longitudinal displacement, and the polygonal shape of the socket and hub member prevents the hub member from turning in the socket. The hub member is therefore rigidly and permanently secured to the stamped metal body, and the structure is sufficiently strong to withstand any turning or twisting strains in opening and closing a valve without injury to or distortion of the wheel.

The structural details illustrated and described may obviously be varied within considerable limits without departing from the essence of the invention, as set forth in the following claims.

I claim:

1. A valve handwheel, comprising a stamped metal body including a rim, a central socket and spokes connecting said rim and socket, and a heavy metal hub member disposed in said socket and having its ends upset to secure said hub member against displacement.

2. A handwheel, comprising a stamped metal body including a rim, a central polygonal socket and spokes connecting said socket and rim, and a relatively heavy malleable hub member positioned in said socket, the ends of said hub member overlying the upper and lower margins of the socket to retain said member against displacement.

3. A handwheel, comprising a stamped metal polygonal socket, a rim connected thereto, and a polygonal malleable hub member positioned in said socket, the upper and lower ends of said member being radially expanded to embrace the upper and lower ends of said socket.

4. A handwheel, comprising a body stamped from sheet metal to provide a rim, a central polygonal socket and spokes connecting said socket and rim, and a malleable metal hub member seated in said socket, the ends of said hub member being radially upset to overlie the upper and lower ends of the socket whereby said hub member is secured against displacement.

5. A handwheel, comprising a stamped metal socket, a hub member disposed in said socket with its ends radially expanded to project beyond the ends of the socket to form flanges embracing the ends of the socket whereby the hub member is secured in the socket, and a rim surrounding and connected to said socket.

6. A hub member of malleable metal for hand-wheels comprising distortable end portions of generally cylindrical shape and a central portion extending outwardly unequal distances from the outer surface of the end portions, at its top and bottom to form shoulders of unequal depth and shaped to provide a plurality of faces between said shoulders, whereby a handwheel having a polygonal socket may be positioned on said hub member and secured by distorting said ends.

VICTOR E. FLODIN.